March 24, 1942. E. F. GUTH 2,277,433
PLASTIC DIFFUSER
Filed May 1, 1940 2 Sheets-Sheet 1

Edwin F. Guth
Inventor
Haynes and Koenig
Attorneys

March 24, 1942.                E. F. GUTH                 2,277,433
                            PLASTIC DIFFUSER
                        Filed May 1, 1940           2 Sheets-Sheet 2

Edwin F. Guth
Inventor
Haynes and Koenig
Attorneys

Patented Mar. 24, 1942

2,277,433

UNITED STATES PATENT OFFICE 2,277,433

PLASTIC DIFFUSER

Edwin F. Guth, Florissant, Mo.

Application May 1, 1940, Serial No. 332,725

5 Claims. (Cl. 240—106)

This invention relates to plastic diffusers, and more particularly to translucent plastic channels especially applicable for use as diffusers with fluorescent and similar lamps.

The principal object of this invention is the provision of plastic diffusers for fluorescent lamps, which are easily constructed of materials which are widely available, and which serve to diffuse light in an even manner. Likewise, it is an object to provide diffusers which may be quickly attached to and detached from the lamps. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a top plan view of a plastic channel;

Similar reference characters indicate corresponding parts throughout the several views of the drawings.

Figure 1:
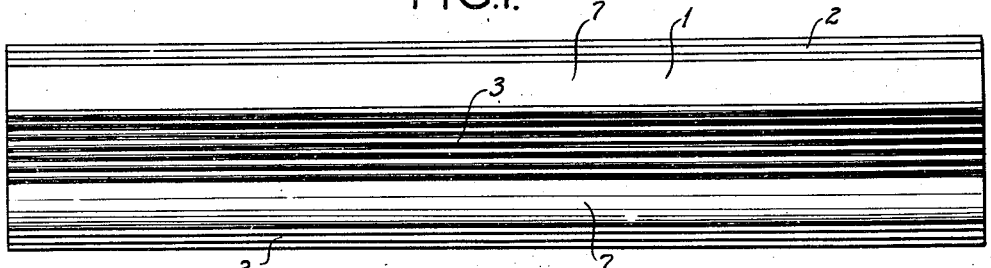
Figure 2:
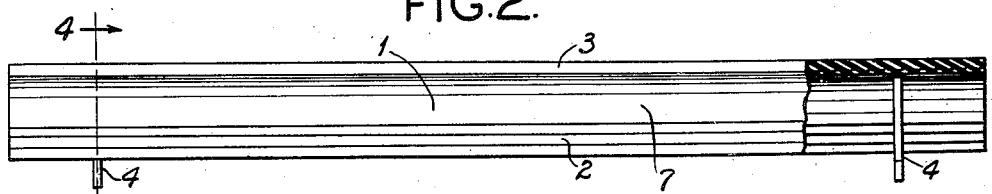
Fig. 2 is a side view partly in section.
Figure 3:
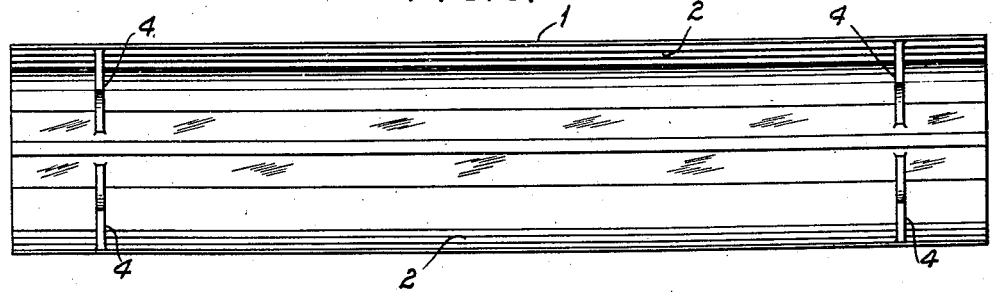
Fig. 3 is a bottom plan view.

In the drawings, 1 represents the main body of the diffuser, which is of a tubular, segmental or channel form and has exterior longitudinal central ribs 3 and lateral ribs 2. These present a zig-zag diffusing surface for better lateral diffusion and are also decorative.

The body 1 is constructed of a thermoplastic translucent material, or from a transparent thermoplastic which is then etched to make it translucent. Integrally and homogeneously formed with the body 1 are projections 4 for use in springingly attaching the channel to the lamp. These are made in appropriate shape to embrace the lamp as shown more clearly in Fig. 4, for example. A plurality of attaching members 4 is shown, since in general, it is desirable to employ more than one, although this is not essential.

The plastic channel is molded from a die of the proper shape in the usual manner from a plastic material, which is either transparent or translucent. Typical of plastics which are suitable are styrene or other vinyl resins, cellulose esters, phenol-formaldehyde and urea-formaldehyde plastics, and resins of the alkyd types. Other materials likewise may be employed, if desired, such as the vinyl-acetal polymers. Various colors may be employed.

In general, a material having a softening point of about 165° F. is preferable for ease in working, although harder or softer materials may likewise be employed. Fluorescent lamps operate at a temperature low enough that a 165° softening point is satisfactory.

Figure 5:
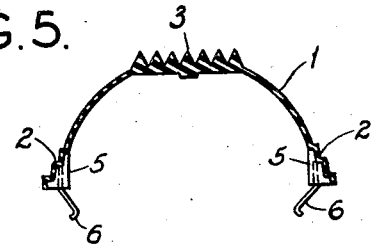
Fig. 5 is a section of the same type as Fig. 4, but showing an alternative embodiment.

An alternative form is shown in Fig. 5, in which lugs 5 are formed integrally homogeneous with the body 1. Springing wires or other attaching members 6 are embedded therein for use in applying the channel to the lamp.

Although translucent plastic materials may in general be employed, it is satisfactory to use a transparent plastic material for the formation of the plastic channels of the present invention, and then to etch the surface of the channel to render it translucent. Plastic channels so formed have substantially no tendency to discolor light rays which pass therethrough. Most translucent plastic materials on the other hand, tend to slightly discolor light rays from fluorescent lamps. In preparing a plastic channel in the preferred manner therefor, a transparent styrene, for example, is employed and the channel formed therefrom. Plane surfaces, such as 7, are then etched with a suitable reagent, such as amyl acetate, to render them translucent.

In use, the plastic channels of the present invention are merely applied directly to the fluorescent lamp, the points 8 of the attaching member being forced over the lamp. The plastic channel itself, it will be found, is sufficiently resilient to permit easy application thereof to a fluorescent lamp, and yet this resiliency will hold the channel firmly in place after its application. The channel may likewise be removed and replaced at will, by merely snapping it on and off the lamp.

The space between the attaching members 4 is made of suitable size to receive the tubular lamp for which a given channel is intended. The channels are preferably prepared in standard lengths, for example, in one foot sections, and two or more may be applied to a lamp which is longer than one foot. For example, four sections may be applied to a four foot lamp to adequately diffuse the light therefrom. If desired, two or more sections may be cemented together to form a permanent connection, or the edges may be subjected to softening temperatures and a bond formed in that manner by bringing them together.

Figure 4:
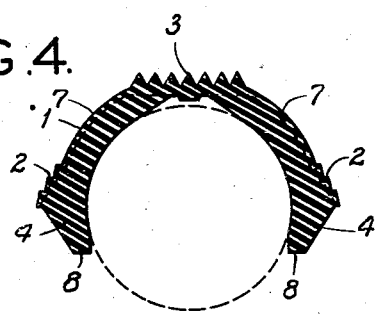
Fig. 4 is an enlarged section taken along line 4—4 in Fig. 2.

The flexible arms 6 which are shown in the Fig. 5 embodiment perform the same functions as the attaching members 4 shown in Fig. 4.

From the foregoing, it will be apparent that the present invention provides diffusers for application to tubular fluorescent lamps which are easily made from widely available materials, and which may be quickly applied to and removed from the lamps. The present diffusers, moreover, may be prepared so as to have substantially no discoloring effect upon the light rays. Since the material from which they are formed is light in weight, the diffusers themselves do not deleteriously affect the weights of the lamps after they are attached thereto. Moreover, the plastic channels are both tough and resilient so that they are relatively indestructible. Neither do they show any substantial tendency toward warping or distortion while in use.

If desired, the attaching members 4 may be positioned at the end of the tubular body 1. When so positioned, they may be cemented together to strengthen the bond between two or more sections when a permanent connection between them is formed, as indicated above. When so placed, the attaching members 4 may be made thinner than shown in the drawings, since when cemented together the thickness of the composite attaching member will be the sum of the thicknesses of the components. The attaching members 4 will in this variation, of course, still perform their function of strengthening the plastic channel, as well as providing means for attaching it to the tubular lamp. This variation is equally applicable to the form shown in Fig. 5. Thus, the lugs 5 may be positioned at the end of the tubular body 1, and used to aid in cementing together a plurality of sections, as well as operating to provide means for supporting the attaching members 6 embedded therein.

Figure 6:
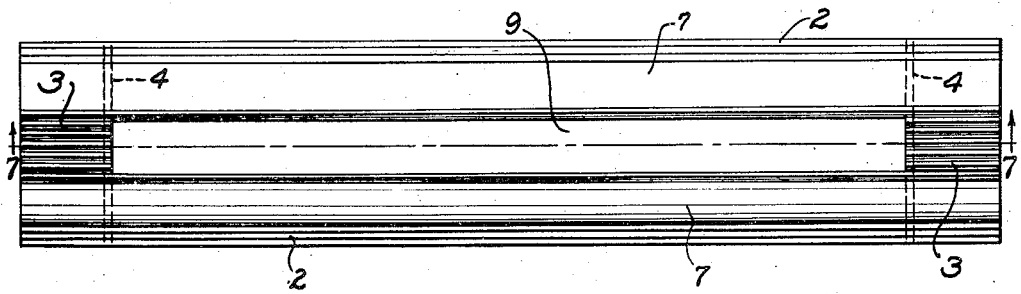
Fig. 6 is a top plan view of an alternative form of a plastic channel made in accordance with the present invention.
Figure 7:
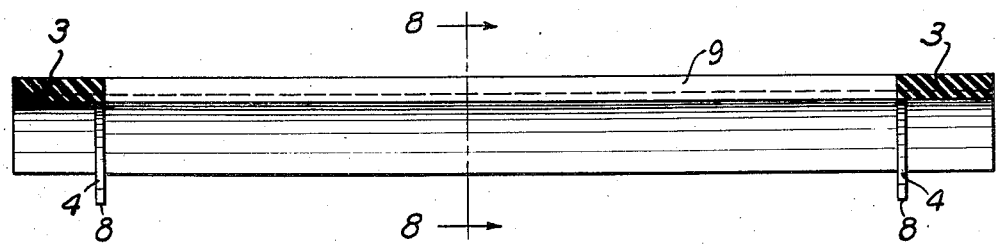
Fig. 7 is a sectional view taken along the line 7—7 of Fig. 6.
Figure 8:
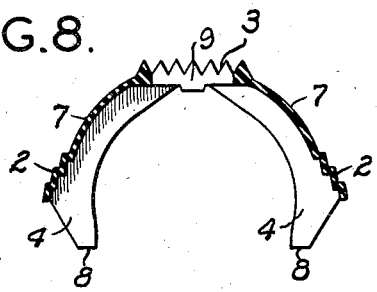
Fig. 8 is an enlarged section taken along the line 8—8 in Fig. 7.

Figures 6, 7 and 8 depict an alternative form of the invention which is particularly useful for fluorescent lamps employed in a horizontal position and with a shade. The plastic channel in this embodiment has its central portion 9 cut away to allow the light rays to project downwardly without interruption, while the side portions 7 remain in place to protect the eyes of the user from glare. When the diffuser, prepared in accordance with this alternative, is employed, there is practically no glare when the lamp is viewed from its ordinary position. In addition, this construction permits a somewhat greater downward light component, permits foreign materials which may collect therein to fall through, and of course presents a saving in materials.

Likewise, the same diffused light component may be obtained with the construction shown in Figures 6 to 8, as in the previous figures, although a thicker or more opaque material is employed in the construction of the plastic channel.

Where extreme rigidity is required, or where unusual strength is desirable, the supporting fins 4 may be made wider than shown in the drawings, or may extend completely across the body of the channel. For most purposes, however, it is not necessary that they be of a width substantially greater in proportion than is shown.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. A diffuser for tubular lamps having low-operating temperatures which comprises a resilient channel-like segment of translucent plastic having at least one inwardly projecting substantially homogeneous portion for use in attaching said diffuser to a lamp, through the resilience of said channel-like segment.

2. A diffuser for tubular lamps having low-operating temperatures comprising a resilient channel-like segment of plastic material, substantially homogeneous means for attachment of said segment to a lamp through the resilience of said channel-like segment, said segment having at least one opening therein permitting escape of direct rays from the lamp without diffusion by the diffuser, said opening being elongate and axially arranged.

3. A diffuser for tubular lamps having low operating temperatures comprising a resilient channel-like segment of a plastic material translucent at least in part, substantially homogeneous means for attachment of said segment to a lamp through the resilience of said channel-like segment, said translucent material having longitudinal ribs effecting lateral diffusion.

4. In combination, a lamp having a low operating temperature and a resilient diffuser of channel shape composed of translucent plastic, said diffuser having at least one inwardly projecting substantially homogeneous plane portion for attaching said diffuser to said lamp through the resilience of said diffuser, said plane portion lying crosswise of the axis of the channel shape to stiffen it.

5. In combination, a lamp having a low operating temperature and a resilient diffuser of channel shape composed of translucent plastic, said diffuser having substantially homogeneous inwardly projecting portions for attaching said diffuser to said lamp through the resilience of said diffuser, said portions being spaced apart but lying substantially in the same plane.

EDWIN F. GUTH.